(12) United States Patent
Westerman (10) Patent No.: US 7,119,853 B1
(45) Date of Patent: Oct. 10, 2006

(54) METHOD OF ELIMINATING FLICKER ON AN INTERLACED MONITOR

(75) Inventor: Larry A. Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/354,938

(22) Filed: Jul. 15, 1999

(51) Int. Cl.
*H04N 5/21* (2006.01)

(52) U.S. Cl. .................. 348/607; 348/447; 348/910
(58) Field of Classification Search ............ 348/607, 348/910, 624, 447; H04N 5/21
See application file for complete search history.

(56) References Cited

U.S. PATENT DOCUMENTS

| | | | |
|---|---|---|---|
| 4,394,774 A | 7/1983 | Widergren et al. | |
| 4,799,105 A | 1/1989 | Mitchell et al. | 358/160 |
| 4,888,529 A | 12/1989 | Madsen et al. | 315/370 |
| 4,947,251 A | 8/1990 | Hentschel | 358/166 |
| 5,019,904 A | 5/1991 | Campbell | 358/140 |
| 5,136,385 A | 8/1992 | Campbell | 358/160 |
| 5,146,329 A | 9/1992 | Flamm | 358/166 |
| 5,182,643 A | 1/1993 | Futscher | 358/140 |
| 5,428,456 A | 6/1995 | Parulski et al. | 358/340 |
| 5,455,628 A | 10/1995 | Bishop | 348/446 |
| 5,694,332 A | 12/1997 | Maturi | |
| 5,901,149 A | 5/1999 | Itakura et al. | |
| 6,130,723 A * | 10/2000 | Medin | 348/607 |
| 6,310,921 B1 | 10/2001 | Yoshioka et al. | |
| 2001/0056353 A1 | 12/2001 | Li et al. | |

OTHER PUBLICATIONS

K. R. Boff, L. Kaufman, J. P. Thomas, Handbook of Perception and Human Performance, 1986, vol. 1, pp. 6.1-6.43.

* cited by examiner

*Primary Examiner*—Sherrie Hsia
(74) *Attorney, Agent, or Firm*—Chernoff, Vilhauer, McClung & Stenzel (57) ABSTRACT

Thin horizontal lines and edges are vulnerable to flickering on an interlaced monitor. To reduce flickering filtering is adaptively applied to the pixels of lines or edges to reduce the flicker energy or contrast of the pixel to a level less than a threshold energy or contrast necessary for flickering under the local conditions. The flicker energy or contrast is a function of the luminance of the line pixel and vertically adjacent background pixels, the number of intensity transitions in the vertical vicinity of the line, and the line length. Adaptive filtering by the described method is computationally conservative and does not adversely effect the detail in the remainder of the image.

60 Claims, 8 Drawing Sheets

METHOD OF ELIMINATING FLICKER ON AN INTERLACED MONITOR

BACKGROUND OF THE INVENTION

The present invention relates to interlaced monitors and, more particularly, to a method of eliminating flicker on an interlaced monitor.

The human visual system retains an image for a fraction of a second after it is viewed. As a result of this "persistence of vision," a series of still images or frames that are presented at a sufficiently high rate will be integrated by the visual system into a "moving picture." However, if the time between images exceeds the period of persistence of vision, the image will not be successfully integrated and it will be perceived to flicker. Persistence of vision decreases as the image intensity increases and, therefore, bright images must be displayed more often to avoid flicker. For example, a frame rate of 24 frames per second may be adequate for a relatively dim motion picture suitable for a theater. However, computer monitors which are much brighter than motion pictures typically utilize frame rates of 72 frames per second or greater to avoid flicker.

Generally, computer monitors employ progressive scanning where a complete frame displayed with each scan. Progressive scanning at high frame rates is acceptable for computer monitors because the data bandwidth is relatively unrestricted. However, to limit the required broadcast bandwidth while presenting a relatively flicker free image, television utilizes an interlaced scan format. In the interlaced scan format, an image or frame is displayed by consecutively displaying two fields, each comprising every other scan line of the raster (frame). The fields are displayed at twice the frame rate. At least for images lacking fine detail, the fields contain sufficient information and are displayed with sufficient frequency to permit the visual system to integrate the two fields into a whole image having an acceptable level of "whole image" flicker. Television in the U.S. and monitors conforming to the NTSC format utilize a frame rate of 30 frames per second with a field rate of 60 fields per second. In Europe, a frame rate of 25 frames per second is common for television.

While interlacing is effective in minimizing the bandwidth required for an acceptable level of "whole image" flickering, an interlaced image may include a number of undesirable artifacts that are the result of the fact that interlacing is not truly rapid repetition of the complete image. Vertically adjacent picture elements do not appear at the same time thereby creating jagged edges on moving objects. Horizontal edges may not match in successive scans creating misalignment or interline flickering (a shimmering effect). Flicker is particularly noticeable in images containing narrow horizontal lines such as computer generated "wire frame" drawings, character sets, and crosshatched areas. The sensation of flickering is the result of the high frequency variation of light intensity as the narrow line or sharp edge is repeatedly scanned, and is a function of the level of illumination and the spatial contrast between the line and its surroundings. Horizontal lines and sharp edges are particularly susceptible to flicker because the discontinuity of intensity that is the line or edge is generally parallel to the horizontal scan lines causing the intensity discontinuity to be repeated at the frame rate, not the field rate.

One method of reducing flicker is to perform a low pass filtering operation in the vertical direction. Filtering transverse to the scan lines reduces the local contrast of horizontal edges and eliminates spatio-temporal components of the image signal that could be visible as flicker. However, each image has a different level of detail and, therefore, a different propensity to flicker. Unfortunately, applying a single filter to all images results in loss of detail in images that would exhibit little tendency to flicker. Parulski et al, U.S. Pat. No. 5,428,456, METHOD AND APPARATUS FOR ADAPTIVELY REDUCING INTERLINE FLICKER OF TV-DISPLAYED IMAGE recognize that certain images require more filtering than others and analyze image content before displaying the image to determine the appropriate level of filtering to apply to each image.

Differences in the level and type of detail and, therefore, the propensity to flicker varies within areas of an image as well as between images. Applying a single filter to an entire image can destroy local vertical detail in areas of the image which would not have produced a flickering sensation. Campbell, U.S. Pat. No. 5,019,904, SCAN CONVERTER WITH ADAPTABLE VERTICAL FILTER FOR SINGLE BIT COMPUTER GRAPHICS SYSTEMS, proposes to filter the image with a filter adapted to local conditions. The method is applied to pixels having two states displayed on a progressive scan monitor. Patterns of pixels known to cause flicker are identified by a pattern recognition generator and a filter coefficient is selected for application to the pixels of the pattern on the basis of the propensity of that pattern to cause flicker. Such pattern recognition is complex and computationally expensive, involving evaluation of patterns of pixels in each fixed area (six pixel (high) by three pixel (wide)) neighborhood of an image. Pattern recognition is more complicated and computationally expensive if applied to pixels capable of multilevel intensities. Further, the patterns identified as producing flickering on a progressive scan monitor do not have the same effect when rendered on an interlaced monitor.

What is desired, therefore, is a computationally inexpensive method of detecting and reducing flickering of horizontal lines or edges displayed on an interlaced monitor without unduly degrading image detail.

SUMMARY OF THE INVENTION

A first aspect of the present invention overcomes the aforementioned drawbacks of the prior art by providing a method of reducing flicker from a display presenting an interlaced image comprising filtering an adjustment pixel to reduce the flicker energy of the adjustment pixel to a level at least equal to a threshold flicker energy. The flicker energy is a function of the intensities of the adjustment pixel and another pixel vertically displaced from the adjustment pixel, the number of intensity transitions vertically displaced from the adjustment pixel, and the length of an approximately horizontal plurality of pixels of approximately equal intensity including the adjustment pixel. The sensation of flicker can be reduced or eliminated by reducing the flicker energy to an energy level equal to or less than a threshold energy known to cause flicker.

A second aspect of the invention provides a method of reducing flicker from a display presenting an interlaced image by filtering an adjustment pixel to reduce the flicker contrast of the adjustment pixel to a contrast at least equal to a threshold flicker contrast. The flicker contrast is a function of the ratio of the difference and sum of intensities of the adjustment pixel and another pixel vertically displaced from the adjustment pixel, a number of intensity transitions vertically displaced from the adjustment pixel, and a length of an approximately horizontal plurality of pixels of approximately equal intensity including the adjustment pixel.

Flicker is reduced on a display presenting an interlaced image by the steps of selecting an adjustment pixel in the image; and applying a filter to at least the adjustment pixel, the filter being adjusted, at least in part, on the basis of at least one of a function of the intensity of the adjustment pixel and the intensity of another pixel vertically displaced from the adjustment pixel; a function of a number of intensity transitions vertically displaced from the adjustment pixel; and a function of the length of an approximately horizontal plurality of pixels of approximately equal intensity including the adjustment pixel. The method is relatively inexpensive, computationally, requiring examination and adjustment of pixel intensity only at points likely to cause flicker. Since the method adaptively filters on a pixel by pixel basis, the detail in the remainder of an image is unaffected by the filtering to reduce flickering of a local line or edge.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Thin horizontal lines and edges, particularly sharp edges, are vulnerable to flickering when displayed on a display presenting an interlaced image. A horizontal line or edge is produced by a discontinuity of intensity or luminance between a plurality of pixels of approximately equal intensity arrayed horizontally and the vertically adjacent pixels of the background. As the horizontal scan lines are generated on the display all or part of the pixels in an approximately horizontal row of pixels (a horizontal line) may be scanned in a single field of the interlaced image. As a result, the intensities of the pixels of a line or edge will vary with a period that exceeds the period of the visual system's persistence of vision, and the line or edge will be perceived to flicker.

Figure 1:
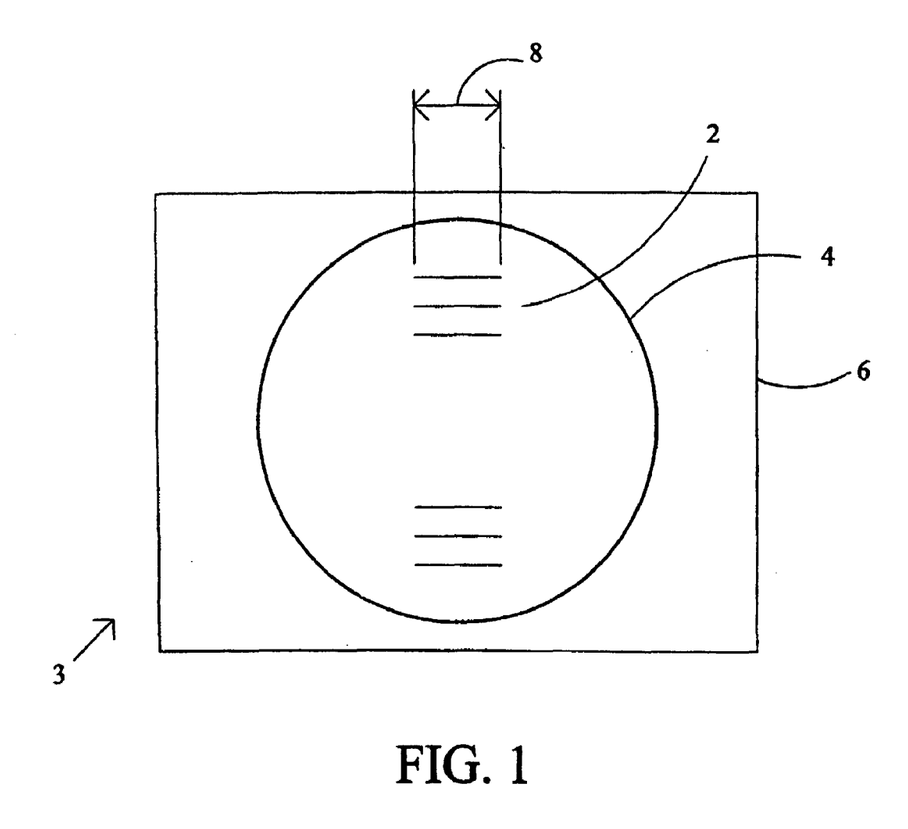
FIG. 1 illustrates an image on an interlaced display used for psychophysical measurements of flicker propensity.

Referring to FIG. 1, to identify factors influencing the perception of flicker, the present inventor performed psychophysical measurements using patterns of horizontal lines displayed on an interlaced monitor 3. Patterns of horizontal lines 2 were displayed on a background 4 of uniform intensity inset in a surround 6 having a different intensity than the background 4. With the intensity of the background 4 and viewing distance held constant, the intensity of the lines 2, as measured by their luminance, was varied until a viewer perceived the onset of flickering of the lines 2. The length 8 and the number of lines 2 in the pattern, the intensity of the background and the viewing distance were independently varied in several series of tests.

Figure 2:
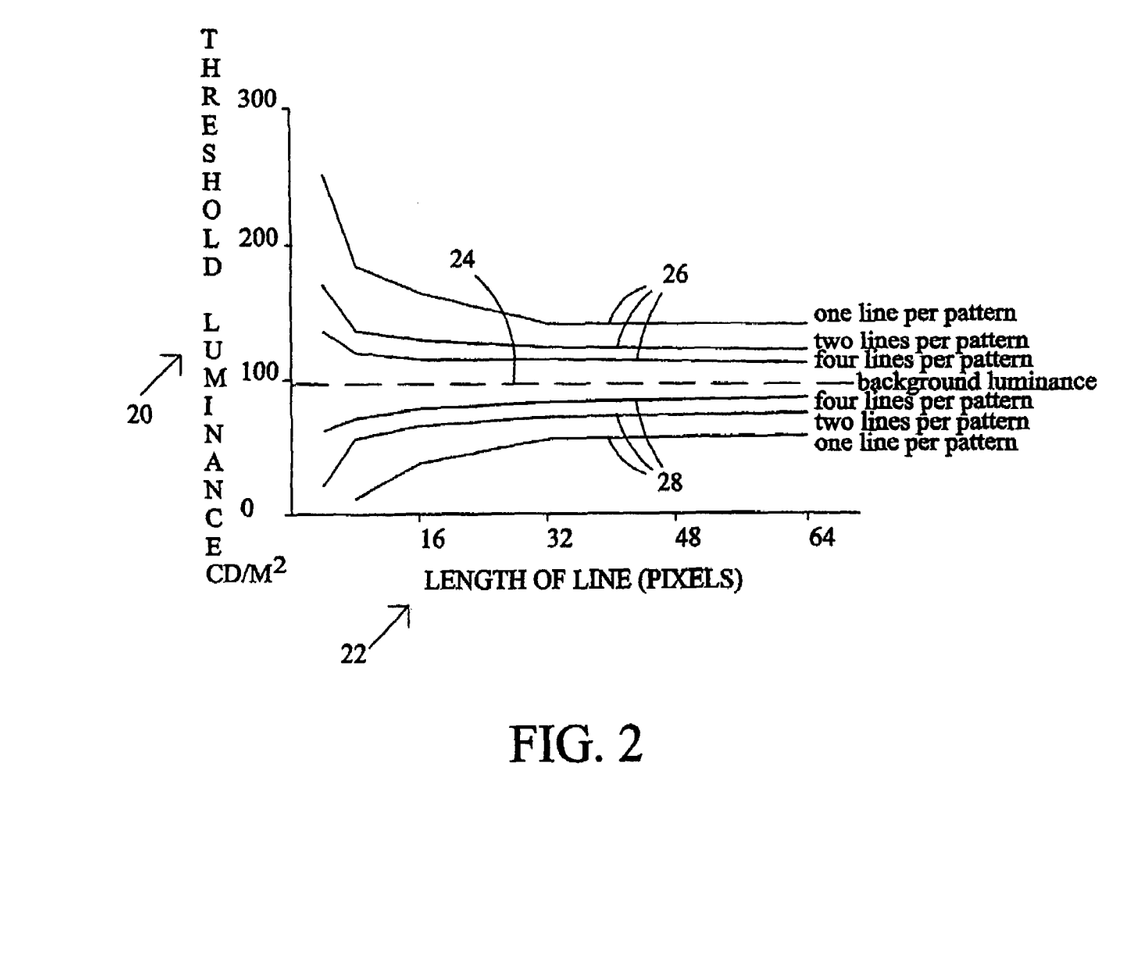
FIG. 2 is a graph of threshold flicker luminance as a function of the number and the length of horizontal lines in a test pattern.

FIG. 2 summarizes the results of a series of tests where the luminance of the background and the viewing distance were held constant while the number of lines in the pattern and their lengths were varied. The luminance at the threshold of flicker 20 is plotted on the vertical axis and the length of the line 22 in pixels is plotted on the horizontal axis. Based on such tests, the present inventor was surprised to observe that the difference between the luminance of the background 24 and the luminance of the lines 26 and 28 at the onset of flicker is a function of the number of lines in the pattern, and the length of the line 22. The number of lines and/or their length may be used as a basis for the reduction of flicker. Luminance values of the background and the lines are added in a signed manner. When the lines of the pattern are brighter (more luminous) than the background, the line luminance at the threshold of flicker 26 is greater than the background luminance 24. When the lines are darker than the background, the luminance of the lines subtracts from the luminance of the background, and the line luminance at the threshold of flicker 28 is less than the background 24.

As illustrated in FIG. 2, as the length of the line increases the difference in intensity between the line and background at which flicker will be perceived decreases. On the other hand, for a fixed line length, the intensity difference at the threshold of flicker perception decreases as the number of lines is increased. The tests revealed little change in the flicker threshold for numbers of lines in a pattern greater than four. These results are likely due to spatial summation performed by the visual system when several spatially separated neurons are simultaneously stimulated. Tests with different viewing distances and levels of background intensity produced similar results.

This test data can be normalized by the following formula:

$$\text{Flicker Energy} = \log\left(\frac{L_{line}}{L_{background}}\right)(\text{Number of Edges})\left(\frac{\text{length}}{\text{length} + \text{end effect}}\right)$$

where:
  $L_{line}$ = the luminance of the line
  $L_{background}$ = the luminance of the background
  Number of edges=number of luminance transitions in a vertical column through the pattern of lines or edges (number of lines+1)
  length=length of the line or edge (number of pixels) end effect=a factor compensating for the horizontal summation properties of the human retinal system The flicker energy accumulates the total energy of the horizontal edges of the pattern of lines and corresponds to the energy in one receptor field in the retina.

Figure 3:
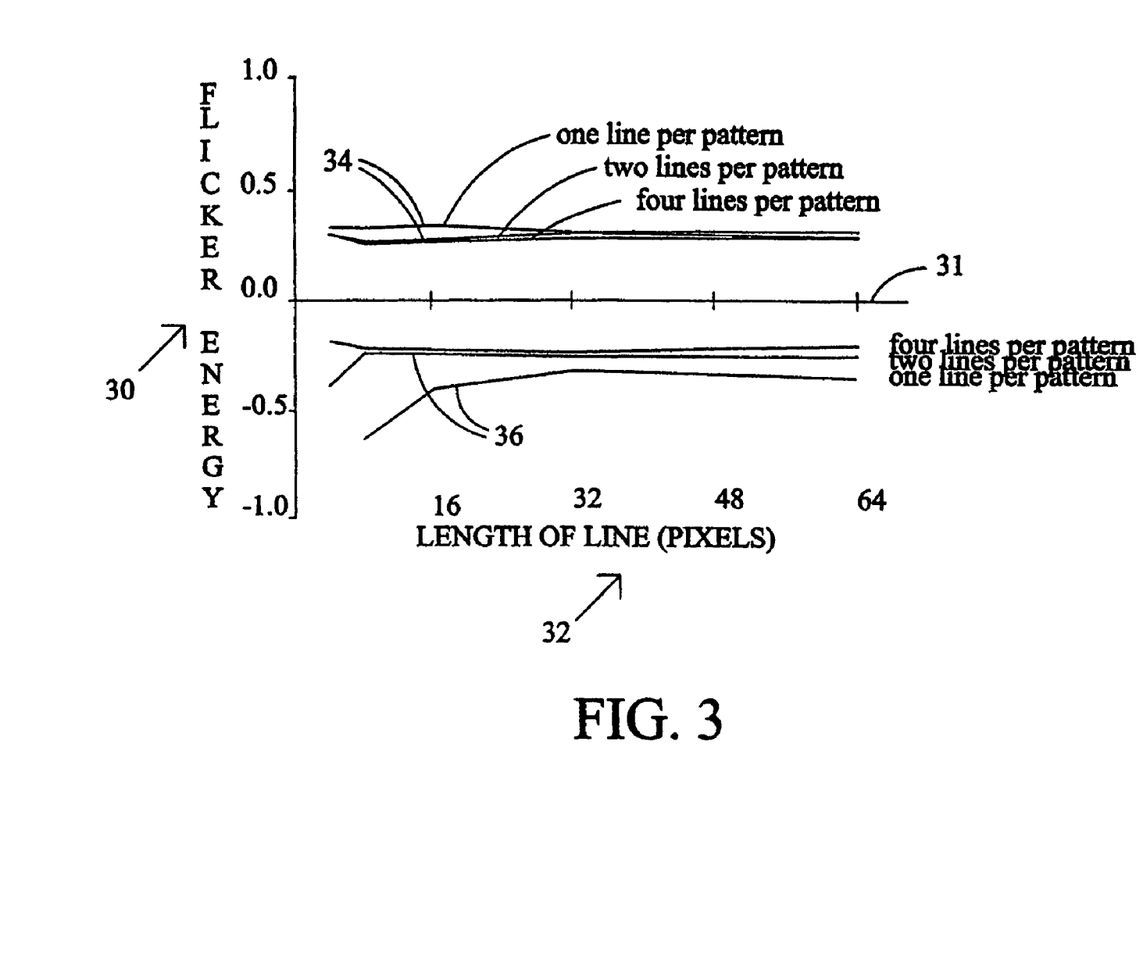
FIG. 3 is a graph of normalized threshold flicker energy as a function of the number and length of horizontal lines in a test pattern.
Figure 4:
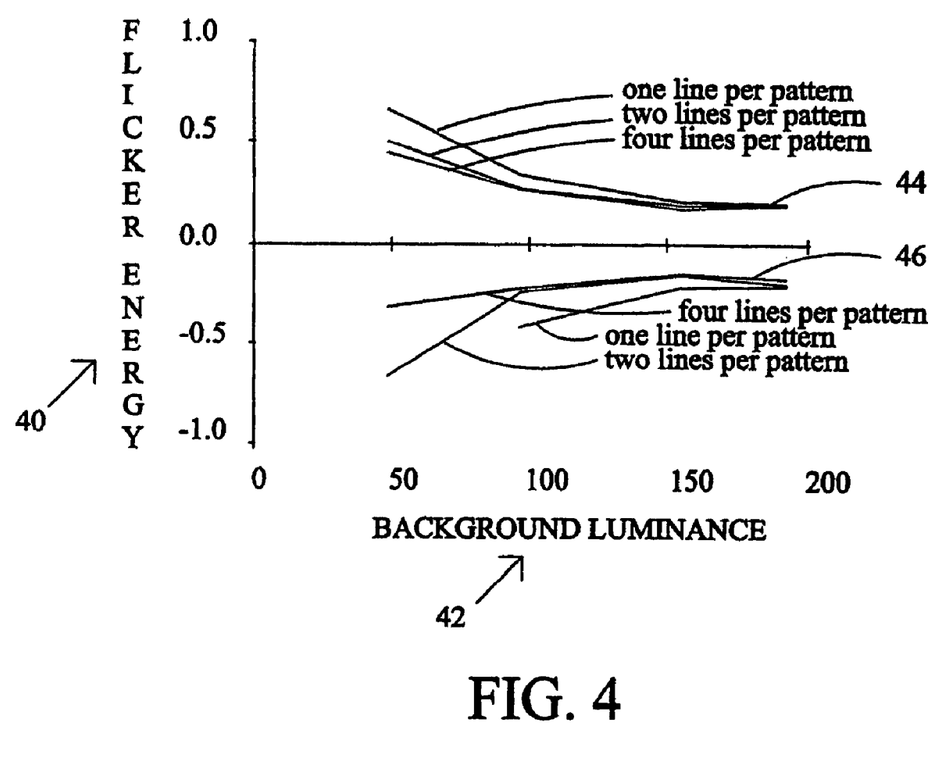
FIG. 4 is a graph of normalized threshold flicker energy as a function of background luminance.

FIG. 3 illustrates the flicker energy of the data of FIG. 2, normalized in accordance with the equation above. Flicker energy 30 is plotted on the vertical axis and line length 32 is plotted along the horizontal axis. The background luminance 31 is the vertical ordinate in the normalized energy plot. Lines brighter than the background result in positive flicker energies 34 and lines darker than the background result in negative flicker energies 36. The flicker energy at the threshold of flicker is relatively invariant for all combinations of the numbers of lines and lengths for both (1) brighter lines on a darker background 34 and (2) darker lines on a lighter background 36. Tests in which viewing distances were varied produced similar results. FIG. 4 illustrates the flicker energy 40 (vertical axis) as a function of the background luminance 42 (horizontal axis) and the number of lines in the pattern for brighter lines 44 and darker lines 46.

The use of a logarithmic function to compute the scaled or flicker energy is appropriate when background intensity is significant (above 40 cd/m$^2$). As an alternative, a flicker contrast, as follows, may be used to determine the onset of flickering of a pattern of horizontal lines:

$$\text{Flicker Contrast} = \left(\frac{L_{line} - L_{background}}{L_{line} + L_{background}}\right)(\text{Number of egdes})\left(\frac{\text{length}}{\text{length} + \text{end effect}}\right)$$

Figure 5:
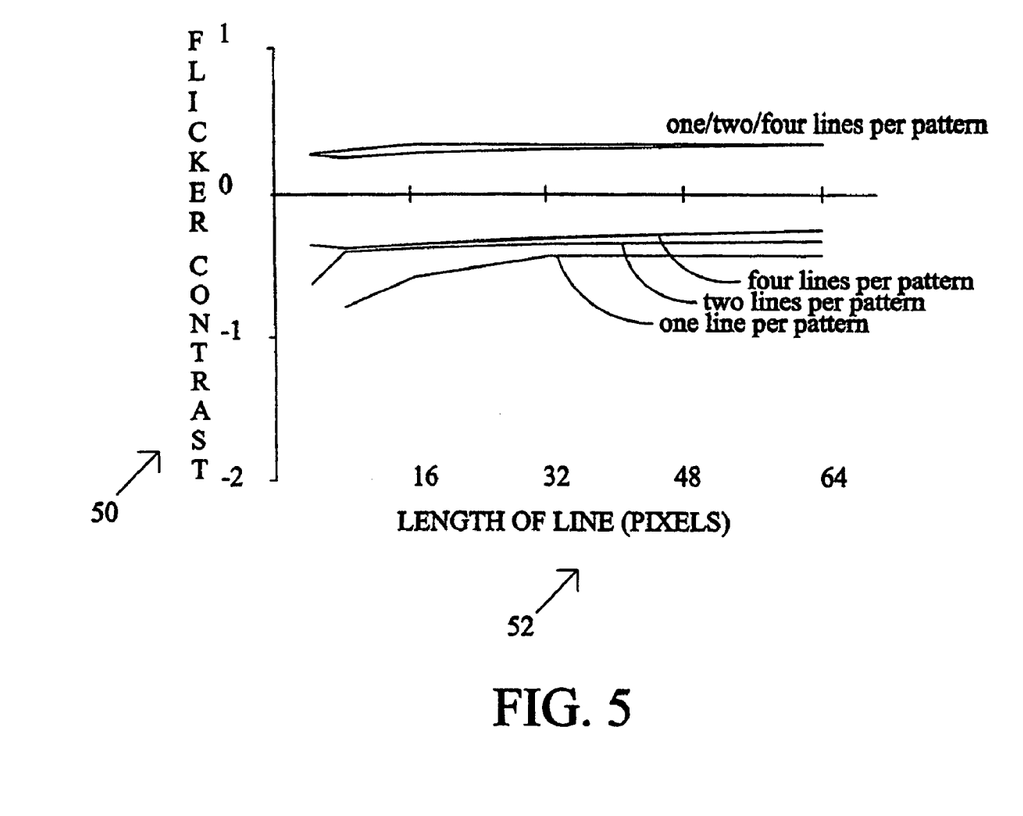
FIG. 5 is a graph of normalized threshold flicker contrast as a function of the number and length of horizontal lines in a test pattern.
Figure 6:
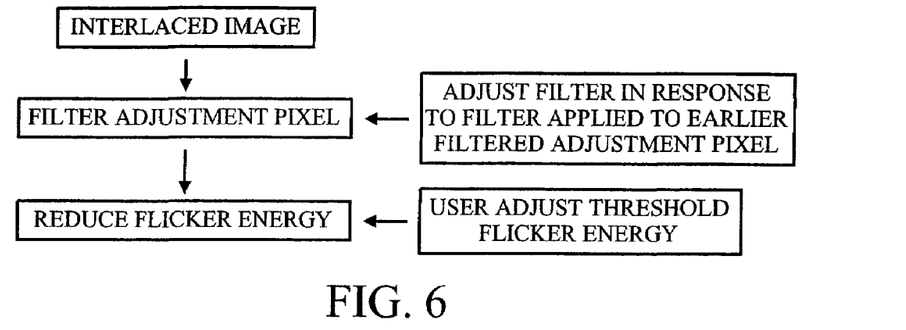
FIGS. 6–15 illustrate image processing techniques.
Figure 7:
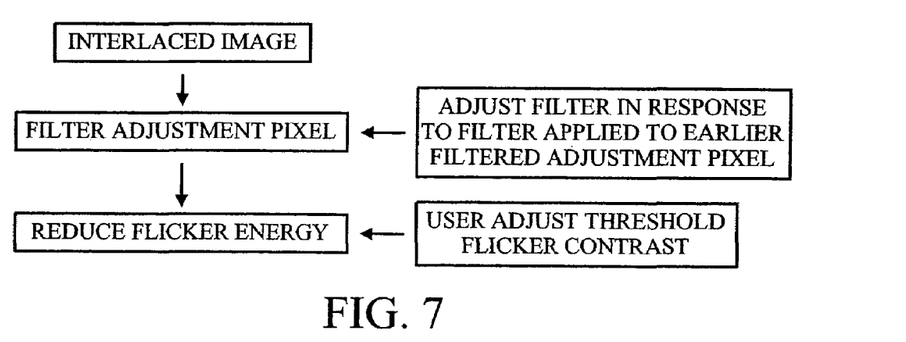
Figure 8:
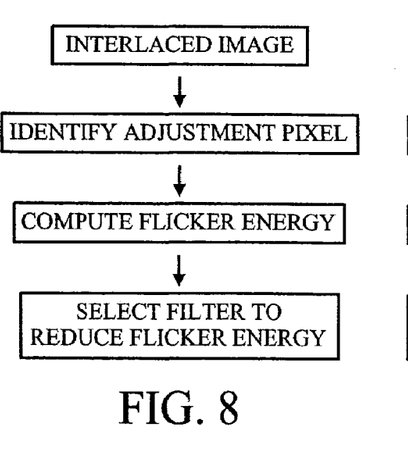
Figure 9:
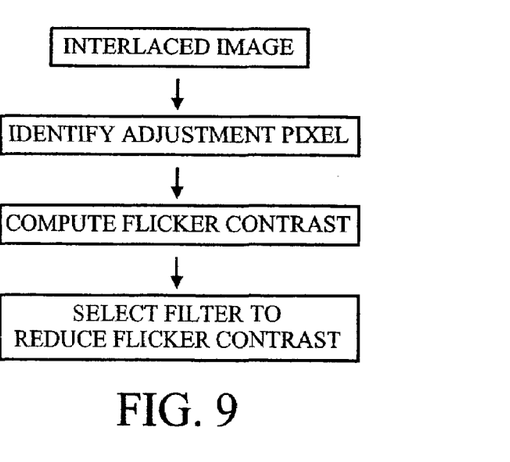
Figure 10:
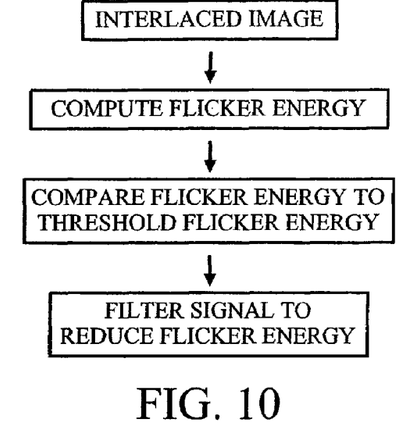
Figure 11:
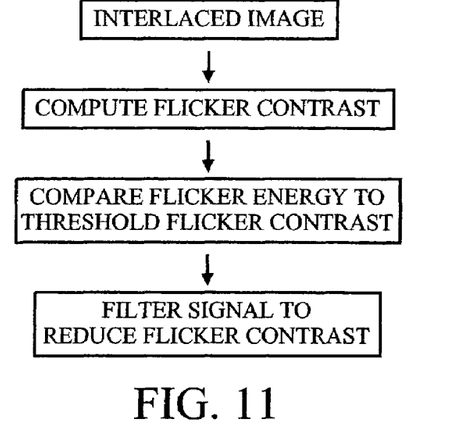
Figure 12:
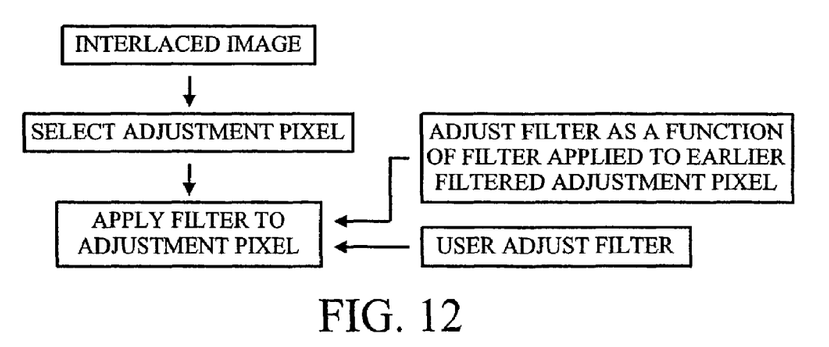
Figure 13:
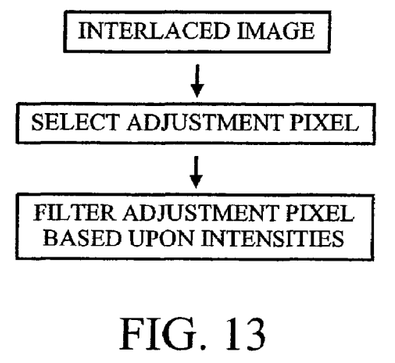
Figure 14:
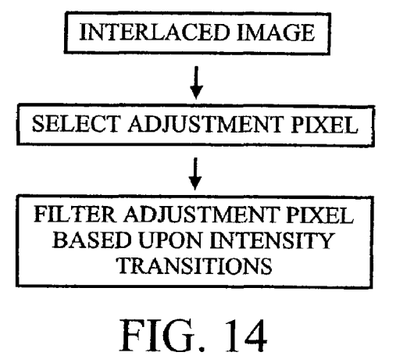
Figure 15:
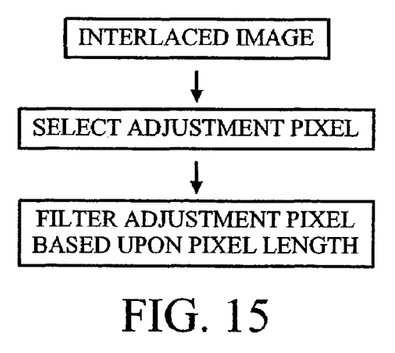

The flicker contrast utilizes the common metric of contrast, the ratio of intensities, to achieve qualitatively the same result while being simpler to compute and avoiding singularities at low background or line intensity values. Referring to FIG. 5, the flicker contrast 50 (vertical axis) exhibits the same invariance as a function of line length 52 (horizontal axis) and number of lines per pattern as is exhibited by the flicker energy.

The end effect term of the flicker energy and flicker contrast equations compensates for the spatial summation performed by the eye's retinal system in integrating the effect of edges (line ends) when the visual field representing the line extends laterally to involve multiple visual receptors. End effect values were determined by the nonlinear least squares best fit to the test data which yielded the smallest variation in the resulting flicker energy for all combinations of line numbers and lengths at a particular background luminance and viewing distance. Exemplary values of the end effect for lines brighter than the background and lines darker than the background at different levels of background luminance are:

| | End effect (number of pixels) | | | |
|---|---|---|---|---|
| Background luminance (cd/m$^2$) | 48 | 96 | 154 | 192 |
| Brighter lines/darker background | 8.9 | 6.3 | 5.0 | 4.3 |
| Darker lines/brighter background | 44.8 | 16.1 | 9.2 | 6.3 |

However, the fit to the test data is not strongly dependent on the exact value of the end effect parameter and an end effect constant may be used. End effect constants of six (6) for lines brighter than the background and twelve (12) for lines darker than the background have been determined to produce satisfactory results.

From the psychophysical investigation, the present inventor concluded that reducing flickering of horizontal lines or edges displayed on a monitor presenting an interlaced image could be optimally accomplished by filtering the signal for a pixel with a filter specifically selected to reduce the flicker energy or the flicker contrast of that pixel below the threshold energy or contrast necessary for flickering. Applying filtering on a pixel-by-pixel basis permits details in an image locality which might result in flickering to be addressed with a level of filtering appropriate to prevent flickering without disturbing details, which would not flicker, in the remainder of the image. An adjustment pixel which is a member of a plurality of pixels of approximately equal luminance and arranged for approximately horizontal presentation on the display (a horizontal line) is identified. The luminance of a background pixel vertically displaced, either above or below, to the adjustment pixel is determined. Likewise, the length of the horizontal line of pixels and/or the number of intensity transitions vertically above and below the adjustment pixel is determined. The flicker energy or the flicker contrast is computed and compared to a threshold flicker energy or contrast, as appropriate. A filter having coefficients that will reduce the luminance of the adjustment pixel sufficiently to cause the flicker energy or flicker contrast to be less than the threshold energy or contrast can be selected and applied to the adjustment pixel.

The filtering can be applied in several ways. For example, the flicker energy can be computed using the original luminance values for all pixels and an output image obtained by filtering the original luminance values to yield a final image. Alternatively, filtering can be applied on a pixel-by-pixel basis with the computation of flicker energy or contrast adjusted at each pixel to reflect prior adjustments of intensity made as a result of processing earlier pixels. Further, filtering can be performed iteratively, with minimal filtering applied at each iteration until the potential for flickering is eliminated.

The psychophysical investigation did disclose considerable variation in the flicker threshold between viewers. As a result of viewer-to-viewer variation, a calibration or adjustment step may be included in the method. The adjustment would permit a viewer to adjust the level of filtering to reduce flicker in "hot spots." The magnitude of the calibration adjustment may then be used to determine the appropriate level of filtering for other combinations of line length, pattern, or contrast. For example, a viewer selected filter level for four lines, eight pixels in length on a black background might be used to ascertain the appropriate flicker energy threshold for all line lengths and numbers for the same background luminance and, by extrapolation, other luminance levels as well.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of reducing flicker from a display presenting an interlaced image comprising the step of filtering an adjustment pixel to reduce a flicker energy of said adjustment pixel to an energy at least equal to a predetermined threshold flicker energy.

2. The method of claim 1 wherein said flicker energy is a function of an intensity of said adjustment pixel and an intensity of another pixel vertically displaced from said adjustment pixel, a number of intensity transitions vertically displaced from said adjustment pixel, and a length of an approximately horizontal plurality of pixels of approximately equal intensity including said adjustment pixel.

3. The method of claim 2 wherein said function of said intensities of said adjustment pixel and said another pixel is a logarithm of a ratio of said intensities.

4. The method of claim 2 wherein said function of said length of said approximately horizontal plurality of pixels comprises a ratio of a number of said pixels included in said plurality and said number of said pixels plus a constant.

5. The method of claim 4 wherein said constant has a first value if said intensity of said adjustment pixel is greater than said intensity of said another pixel and a second value if said intensity of said adjustment pixel is less than said intensity of said another pixel.

6. The method of claim 1 wherein said threshold flicker energy is adjustable by a user of said display.

7. The method of claim 1 further comprising the step of adjusting said filtering of said adjustment pixel in response to filtering applied to an earlier filtered adjustment pixel.

8. A method of reducing flicker from a display presenting an interlaced image comprising filtering a signal for an adjustment pixel to reduce a flicker contrast of said adjustment pixel to a contrast at least equal to a predetermined threshold flicker contrast.

9. The method of claim 8 wherein said flicker contrast is a function of an intensity of said adjustment pixel and an intensity of another pixel vertically displaced from said adjustment pixel, a number of intensity transitions vertically displaced from said adjustment pixel, and a length of an approximately horizontal plurality of pixels of approximately equal intensity including said adjustment pixel.

10. The method of claim 9 wherein said function of said intensities of said adjustment pixel and said another pixel is a ratio of the difference and the sum of said intensities of said adjustment pixel and said another pixel.

11. The method of claim 9 wherein said function of said length of said approximately horizontal plurality of pixels comprises a ratio of a number of said pixels included in said approximately horizontal plurality of pixels and said number of said pixels plus a constant.

12. The method of claim 11 wherein said constant has a first value if said intensity of said adjustment pixel is greater than said intensity of said another pixel and a second value if said intensity of said adjustment pixel is less than said intensity of said another pixel.

13. The method of claim 8 wherein said threshold flicker contrast is adjustable by a user of said display.

14. The method of claim 8 further comprising the step of adjusting said filtering of said adjustment pixel in response to filtering applied to an earlier filtered adjustment pixel.

15. A method of reducing flicker from a display presenting an interlaced image comprising the steps of:
(a) identifying an adjustment pixel in a plurality of pixels of approximately equal intensity and arrayed for approximately horizontal presentation on said display, said adjustment pixel having an intensity different from a background pixel vertically displaced from said adjustment pixel;
(b) computing a flicker energy of said adjustment pixel; and
(c) selecting a filter to reduce said flicker energy of said adjustment pixel to an energy less than a threshold flicker energy for said adjustment pixel.

16. The method of claim 15 wherein said flicker energy is a function of said intensities of said adjustment pixel and said background pixel, a number of intensity changes in a vertical vicinity of said adjustment pixel and a number of pixels included in said plurality of pixels of approximately equal intensity.

17. The method of claim 16 wherein said function of said intensities of said adjustment pixel and said background pixel is a logarithm of a ratio of said intensities.

18. The method of claim 16 wherein said function of said number of pixels included in said plurality of pixels is a ratio of said number of pixels and the sum of said number of pixels and a constant.

19. The method of claim 18 wherein said constant is a first constant if said intensity of said adjustment pixel is greater than said intensity of said background pixel and a second constant if said intensity of said adjustment pixel is less than said intensity of said background pixel.

20. The method of claim 15 wherein said threshold flicker energy is adjustable by a user of said display.

21. The method of claim 15 further comprising the step of adjusting said filter for said adjustment pixel in response to filtering applied to an earlier filtered adjustment pixel.

22. A method of reducing flicker of a display presenting an interlaced image comprising the steps of:
(a) identifying an adjustment pixel in a plurality of pixels of approximately equal intensity and arrayed for approximately horizontal presentation on said display, said adjustment pixel having an intensity different from an intensity of a background pixel vertically displaced from said adjustment pixel;
(b) computing a flicker contrast of said adjustment pixel; and
(c) selecting a filter to reduce said flicker contrast of said adjustment pixel to a contrast less than a threshold flicker contrast for said adjustment pixel.

23. The method of claim 22 wherein said flicker contrast is a function of said intensities of said adjustment pixel and said background pixel, a number of intensity changes in a vertical vicinity of said adjustment pixel and a number of pixels included in said plurality of pixels of approximately equal intensity.

24. The method of claim 23 wherein said function of said intensities of said adjustment pixel and said background pixel is a ratio of the difference and the sum of said intensities.

25. The method of claim 23 wherein said function of said number of pixels included in said plurality of pixels is a ratio of said number of pixels and the sum of said number of pixels and a constant.

26. The method of claim 25 wherein said constant is a first constant if said intensity of said adjustment pixel is greater than said intensity of said background pixel and a second constant if said intensity of said adjustment pixel is less than said intensity of said background pixel.

27. The method of claim 22 wherein said threshold flicker contrast is adjustable by a user of said display.

28. The method of claim 22 further comprising the step of adjusting said filter for said adjustment pixel in response to filtering applied to an earlier filtered adjustment pixel.

29. A method of reducing flickering of a horizontal intensity discontinuity on a display presenting an interlaced image comprising:
(a) computing a flicker energy for an adjustment pixel said flicker energy being a function of a ratio of an intensity of said adjustment pixel and an intensity of a background pixel vertically adjacent to said adjustment pixel, a number of horizontal intensity discontinuities in a vertical vicinity of said adjustment pixel, and a length of said horizontal intensity discontinuity;
(b) comparing said flicker energy to a threshold flicker energy; and (c) filtering a signal for said adjustment pixel to reduce said flicker energy to an energy at least equal to said threshold flicker energy.

30. A method of reducing flickering of a horizontal intensity discontinuity on a display presenting an interlaced image comprising:
   (a) computing a flicker contrast for an adjustment pixel said flicker contrast being a function of a ratio of the difference of an intensity of said adjustment pixel and an intensity of a background pixel vertically displaced from said adjustment pixel and a sum of said intensities, a number of horizontal intensity discontinuities in a vertical vicinity of said adjustment pixel, and a length of said horizontal intensity discontinuity;
   (b) comparing said flicker contrast to a threshold flicker contrast; and
   (c) filtering a signal for said adjustment pixel to reduce said flicker contrast to a contrast at least equal to said threshold flicker contrast.

31. A method of reducing flicker on a display presenting an interlaced image comprising the steps of:
   (a) selecting an adjustment pixel of said image; and
   (b) applying a filter to at least said adjustment pixel, said filter being adjusted, at least in part, on the basis of at least one of;
      (i) a logarithmic based function of an intensity of said adjustment pixel and an intensity of another pixel vertically displaced from said adjustment pixel;
      (ii) a function of a number of intensity transitions vertically displaced from said adjustment pixel; and
      (iii) a function of a length of an approximately horizontal plurality of pixels of approximately equal intensity including said adjustment pixel.

32. A method of reducing flicker on a display presenting an interlaced image comprising the steps of:
   (a) selecting an adjustment pixel of said image; and
   (b) applying a filter to at least said adjustment pixel said filter being adjusted, at least in part, on the basis of at least one of;
      (i) a function of an intensity of said adjustment pixel and an intensity of another pixel vertically displaced from said adjustment pixel;
      (ii) a function of a number of intensity transitions vertically displaced from said adjustment pixel; and
      (iii) a function of a length of an approximately horizontal plurality of pixels of approximately equal intensity including said adjustment pixel.

33. The method of claim 32 wherein said function of said intensities of said adjustment pixel and said another pixel is a logarithm of a ratio of said intensities.

34. The method of claim 32 wherein said function of said intensities of said adjustment pixel and said another pixel is a ratio of the difference and the sum of said intensities.

35. The method of claim 32 wherein said function of said length of said approximately horizontal plurality of pixels comprises a ratio of a number of said pixels included in said plurality and said number of said pixels plus a constant.

36. The method of claim 35 wherein said constant has a first value if said intensity of said adjustment pixel is greater than said intensity of said another pixel and a second value if said intensity of said adjustment pixel is less than said intensity of said another pixel.

37. The method of claim 32 wherein said filter is further adjustable by a user of said display.

38. A method of reducing flicker on a display presenting an interlaced image comprising the steps of:
   (a) selecting an adjustment pixel of said image; and
   (b) applying a filter to at least said adjustment pixel, said filter being adjusted, at least in part, on the basis of a logarithmic based function of an intensity of said adjustment pixel and an intensity of another pixel vertically displaced from said adjustment pixel.

39. The method of claim 38 wherein said function of said intensities of said adjustment pixel and said another pixel is a ratio of the difference and the sum of said intensities.

40. A method of reducing flicker on a display presenting an interlaced image comprising the steps of:
   (a) selecting an adjustment pixel of said image; and
   (b) applying a filter to at least said adjustment pixel said filter being adjusted, at least in part, on the basis of a function an intensity of said adjustment pixel and an intensity of another pixel vertically displaced from said adjustment pixel.

41. A method of reducing flicker on a display presenting an interlaced image comprising the steps of:
   (a) selecting an adjustment pixel of said image; and
   (b) applying a filter to at least said adjustment pixel, said filter being adjusted, at least in part, on the basis of a function of intensity transitions vertically displaced from said adjustment pixel.

42. A method of reducing flicker on a display presenting an interlaced image comprising the steps of:
   (a) selecting an adjustment pixel of said image; and
   (b) applying a filter to at least said adjustment pixel, said filter being adjusted, at least in part, on the basis of a function of a length of an approximately horizontal plurality of pixels of approximately equal intensity including said adjustment pixel.

43. The method of claim 42 wherein said function of said length of said approximately horizontal plurality of pixels comprises a ratio of a number of said pixels included in said plurality and said number of said pixels plus a constant.

44. The method of claim 43 wherein said constant has a first value if an intensity of said adjustment pixel is greater than an intensity of another pixel vertically displaced relative to said adjustment pixel and a second value if said intensity of said adjustment pixel is less than said intensity of said another pixel.

45. A method of reducing flicker from a display presenting an interlaced image comprising the step of filtering an adjustment pixel to reduce a flicker energy of said adjustment pixel to an energy at least equal to a threshold flicker energy, wherein said flicker energy is a function of an intensity of said adjustment pixel and an intensity of another pixel vertically displaced from said adjustment pixel, a number of intensity transitions vertically displaced from said adjustment pixel, and a length of an approximately horizontal plurality of pixels of approximately equal intensity including said adjustment pixel.

46. A method of reducing flicker from a display presenting an interlaced image comprising the step of filtering an adjustment pixel to reduce a flicker energy of said adjustment pixel to an energy at least equal to a threshold flicker energy, wherein a function of the intensities of said adjustment pixel and said another pixel is a logarithm of a ratio of said intensities.

47. A method of reducing flicker from a display presenting an interlaced image comprising the step of filtering an adjustment pixel to reduce a flicker energy of said adjustment pixel to an energy at least equal to a threshold flicker energy, wherein a function of a length of approximately horizontal plurality of pixels comprises a ratio of a number of said pixels included in said plurality and said number of said pixels plus a constant.

48. The method of claim 47 wherein said constant has a first value if said intensity of said adjustment pixel is greater than said intensity of said another pixel and a second value if said intensity of said adjustment pixel is less than said intensity of said another pixel.

49. A method of reducing flicker from a display presenting an interlaced image comprising filtering a signal for an adjustment pixel to reduce a flicker contrast of said adjustment pixel to a contrast at least equal to a threshold flicker contrast, wherein said flicker contrast is a function of an intensity of said adjustment pixel and an intensity of another pixel vertically displaced from said adjustment pixel, a number of intensity transitions vertically displaced from said adjustment pixel, and a length of an approximately horizontal plurality of pixels of approximately equal intensity including said adjustment pixel.

50. The method of claim 49 wherein said function of said intensities of said adjustment pixel and said another pixel is a ratio of the difference and the sum of said intensities of said adjustment pixel and said another pixel.

51. The method of claim 49 wherein said function of said length of said approximately horizontal plurality of pixels comprises a ratio of a number of said pixels included in said approximately horizontal plurality of pixels and said number of said pixels plus a constant.

52. The method of claim 51 wherein said constant has a first value if said intensity of said adjustment pixel is greater than said intensity of said another pixel and a second value if said intensity of said adjustment pixel is less than said intensity of said another pixel.

53. A method of reducing flicker on a display presenting an interlaced image comprising the steps of:
 (a) selecting an adjustment pixel of said image; and
 (b) applying a filter to at least said adjustment pixel said filter being adjusted, at least in part, on the basis of at least one of;
  (i) a function of an intensity of said adjustment pixel and an intensity of another pixel vertically displaced from said adjustment pixel;
  (ii) a function of a number of intensity transitions vertically displaced from said adjustment pixel; and
  (iii) a function of a length of an approximately horizontal plurality of pixels of approximately equal intensity including said adjustment pixel, wherein said function of said intensities of said adjustment pixel and said another pixel is a logarithm of a ratio of said intensities.

54. A method of reducing flicker on a display presenting an interlaced image comprising the steps of:
 (a) selecting an adjustment pixel of said image; and
 (b) applying a filter to at least said adjustment pixel said filter being adjusted, at least in part, on the basis of at least one of;
  (i) a function of an intensity of said adjustment pixel and an intensity of another pixel vertically displaced from said adjustment pixel;
  (ii) a function of a number of intensity transitions vertically displaced from said adjustment pixel; and
  (iii) a function of a length of an approximately horizontal plurality of pixels of approximately equal intensity including said adjustment pixel, wherein said function of said intensities of said adjustment pixel and said another pixel is a ratio of the difference and the sum of said intensities.

55. A method of reducing flicker on a display presenting an interlaced image comprising the steps of:
 (a) selecting an adjustment pixel of said image; and
 (b) applying a filter to at least said adjustment pixel said filter being adjusted, at least in part, on the basis of at least one of;
  (i) a function of an intensity of said adjustment pixel and an intensity of another pixel vertically displaced from said adjustment pixel;
  (ii) a function of a number of intensity transitions vertically displaced from said adjustment pixel; and
  (iii) a function of a length of an approximately horizontal plurality of pixels of approximately equal intensity including said adjustment pixel, wherein said function of said length of said approximately horizontal plurality of pixels comprises a ratio of a number of said pixels included in said plurality and said number of said pixels plus a constant.

56. The method of claim 55 wherein said constant has a first value if said intensity of said adjustment pixel is greater than said intensity of said another pixel and a second value if said intensity of said adjustment pixel is less than said intensity of said another pixel.

57. A method of reducing flicker on a display presenting an interlaced image comprising the steps of:
 (a) selecting an adjustment pixel of said image; and
 (b) applying a filter to at least said adjustment pixel said filter being adjusted, at least in part, on the basis of a function an intensity of said adjustment pixel and an intensity of another pixel vertically displaced from said adjustment pixel, wherein said function of said intensities of said adjustment pixel and said another pixel is a logarithm of a ratio of said intensities.

58. A method of reducing flicker on a display presenting an interlaced image comprising the steps of:
 (a) selecting an adjustment pixel of said image; and
 (b) applying a filter to at least said adjustment pixel said filter being adjusted, at least in part, on the basis of a function an intensity of said adjustment pixel and an intensity of another pixel vertically displaced from said adjustment pixel, wherein said function of said intensities of said adjustment pixel and said background pixel is a ratio of the difference and the sum of said intensities.

59. A method of reducing flicker on a display presenting an interlaced image comprising the steps of:
 (a) selecting an adjustment pixel of said image; and
 (b) applying a filter to at least said adjustment pixel, said filter being adjusted, at least in part, on the basis of a function of a length of an approximately horizontal plurality of pixels of approximately equal intensity including said adjustment pixel, wherein said function of said length of said approximately horizontal plurality of pixels comprises a ratio of a number of said pixels included in said plurality and said number of said pixels plus a constant.

60. The method of claim 59 wherein said constant has a first value if an intensity of said adjustment pixel is greater than an intensity of another pixel vertically adjacent to said adjustment pixel and a second value if said intensity of said adjustment pixel is less than said intensity of said another pixel.

* * * * *

UNITED STATES PATENT AND TRADEMARK OFFICE
CERTIFICATE OF CORRECTION

| | | |
|---|---|---|
| PATENT NO. | : 7,119,853 B1 | Page 1 of 1 |
| APPLICATION NO. | : 09/354938 | |
| DATED | : October 10, 2006 | |
| INVENTOR(S) | : Westerman | |

It is certified that error appears in the above-identified patent and that said Letters Patent is hereby corrected as shown below:

Column 4, line 45 - change "Line" to --Lline--

Signed and Sealed this

First Day of April, 2008

JON W. DUDAS
*Director of the United States Patent and Trademark Office*